(12) United States Patent
Kralles et al.

(10) Patent No.: US 6,227,731 B1
(45) Date of Patent: May 8, 2001

(54) PRINTING APPARATUS

(75) Inventors: Christopher J. Kralles, Rochester; John G. Weigand; Michael J. Chapman, both of Churchville, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/418,230

(22) Filed: Oct. 14, 1999

(51) Int. Cl.⁷ ........................................ B41J 11/26
(52) U.S. Cl. .......................... 400/611; 101/228; 226/110
(58) Field of Search .................... 101/225, 228, 101/219; 400/605, 611, 612, 613, 613.1, 613.2, 613.3, 613.4, 614, 617, 618, 619, 621; 226/109, 110, 21; 347/104; 198/814

(56) References Cited

U.S. PATENT DOCUMENTS

| | | |
|---|---|---|
| 4,008,957 | 2/1977 | Summers . |
| 4,311,379 | 1/1982 | Falomo . |
| 4,421,228 * | 12/1983 | Marsiglio et al. ................. 198/814 |
| 4,466,579 | 8/1984 | Nitsch et al. . |
| 4,725,050 * | 2/1988 | Fujishiro ............................ 226/110 |
| 4,814,793 | 3/1989 | Hamada et al. . |
| 4,825,622 * | 5/1989 | Nigg .................................. 226/110 |
| 4,843,430 | 6/1989 | Huber et al. . |
| 4,878,067 | 10/1989 | Yagoto et al. . |
| 4,891,653 | 1/1990 | Hamada et al. . |
| 4,958,169 | 9/1990 | Mochizuki et al. . |
| 4,996,541 | 2/1991 | Mori et al. . |
| 5,292,397 | 3/1994 | Lorenz et al. . |
| 5,296,906 * | 3/1994 | Hano et al. ........................ 226/110 |
| 5,389,999 | 2/1995 | Franci et al. . |
| 5,397,289 * | 3/1995 | Entz et al. .......................... 492/17 |
| 5,413,039 * | 5/1995 | Sohma ................................ 101/225 |
| 5,558,263 * | 9/1996 | Long ................................... 226/21 |
| 5,585,879 | 12/1996 | Tahara et al. . |
| 6,065,401 * | 5/2000 | Marmin ............................. 101/228 |

FOREIGN PATENT DOCUMENTS

| | | |
|---|---|---|
| 675639 A5 | 10/1990 | (CH) . |
| 29 23 469 A1 | 6/1979 | (DE) . |
| 3713171 C2 | 4/1987 | (DE) . |
| 0 629 900 A1 | 6/1993 | (EP) . |
| 0 738 915 A2 | 4/1996 | (EP) . |
| 0 738 915 A3 | 4/1996 | (EP) . |
| 2189469 * | 10/1987 | (GB) ................................. 101/228 |

* cited by examiner

*Primary Examiner*—Eugene Eickholt
(74) *Attorney, Agent, or Firm*—David A. Novais

(57) ABSTRACT

A printing apparatus includes a media supply section and a media take-up section. Each section is capable of accepting a plurality of cassettes. On the supply section side, the cassettes can contain a roll of photosensitive material that is to be processed through a printing section. The cassettes on the take-up sections are initially empty and are designed to receive the web of photosensitive material after the web has been conveyed through the printing section. The cassettes can be provided at a plurality of locations and can be angularly positioned with respect to each other. A single transport assembly can be provided at each of the supply section and take-up section, and can be rotatable about a rotatable point so as to accept or discharge media to each of the appropriate cassettes. A splicer is provided on the transport assembly in the supply section, for splicing the end of the material from an empty cassette, and is also rotatable with the transport assembly. In a feature of the present invention, the material can undergo a vertical twist, which results from the pivoting of the paper path by way of the transport assembly.

27 Claims, 8 Drawing Sheets

PRINTING APPARATUS

FIELD OF THE INVENTION

The present invention relates to a printing apparatus which can feed a long strip of media, such as photographic paper more or less continuously from a supply cassette, to a supply section, to a printing section, and thereafter to a take-up section. The printing apparatus of the present invention is of a modular design and is configured to provide for vertical twisted web paths while at the same time minimizing web tracking variation.

BACKGROUND OF THE INVENTION

Conventionally, when a printing apparatus includes a plurality of supply cassettes and take-up cassettes, a complex shuttle mechanism and complex paper handling are required. For example, in an apparatus which includes a plurality of supply cassettes and take-up cassettes, it is necessary to divert a web of photosensitive media, such as photosensitive paper, through a plurality of loops which requires a complex interface. Furthermore, for the purpose of splicing the photosensitive media at the supply side of a multi-cassette arrangement, it is necessary to divert the paper into a splicer separately for each entry position of the cassette.

SUMMARY OF THE INVENTION

The present invention provides for a printing apparatus having multiple supply cassettes and take-up cassettes which is of a modular design and creates a paper path that follows an exact constraint design. The paper path of the printing apparatus of the present invention is configured to accept media from a plurality of supply cassettes and deliver media to a plurality of take-up cassettes. The paper path is separated into tensioned web spans which include, for example, a paper supply span, a paper punching span, a write engine span and a paper take-up span. The spans can be isolated from each other by motion control slack loops.

The printing apparatus of the present invention comprises three separable sections, which include a supply section, a center printing section, and a take-up section. The breaks between the above sections are preferably located within the supply and the take-up sections, and are the locations in which the web can undergo a vertical twist. This vertical twist is the result of a pivoting of the paper path by an angle of between 0–90 degrees, for example, an angle of ±30 degrees between the plurality of supply cassettes and take-up cassettes. The design of the present invention provides for exact constraint web handling while at the same time, minimizing the effect that twisting and frame tolerances have on web tracking.

The present invention provides for a printing apparatus which comprises a media supply section having a transport assembly and a plurality of media entry openings. The transport assembly is rotatable to each of the media entry openings so as to accept media from a selected one of the media entry openings. The printing apparatus further comprises a printing section which is adapted to accept the media from the media supply section and a take-up section which is adapted to receive media from the printing section. The take-up section includes a take-up assembly and a plurality of media exit openings. The take-up assembly is rotatable to each of the media exit openings so as to discharge media through a selected one of the media exit openings.

The present invention also provides for a printing apparatus which includes a media supply section comprising a first transport assembly that conveys media along a first transport assembly longitudinal axis. The first transport assembly is rotatable between a plurality of supply entry ports on the media supply section to selectively accept media from each of the supply entry ports. The first transport assembly further comprises at least one first roller which is rotatable with respect to the first transport assembly about the first transport assembly longitudinal axis. The printing apparatus further comprises a printing section that receives media from the media supply section. The printing section comprises a first guide plate that guides media from the at least one first roller into the printing section. The first transport assembly has at least one rotatable position which creates a twist in a media span of the media between the at least one first roller and the first guide plate.

The present invention further provides for a media supply assembly which comprises a plurality of media entry ports; a transport assembly that is rotatable to each of the media entry ports to receive and convey media entering through the media entry ports along a longitudinal axis; and at least one roller mounted on the transport assembly so as to be rotatable about the longitudinal axis. The at least one roller conveys media along the transport assembly toward an exit port of the media supply assembly.

The present invention further provides for a media take-out assembly that comprises a media entry port; a plurality of media exit ports; a transport assembly that conveys media from the media entry port to one of the media exit ports, with the transport assembly being rotatable to each of the media exit ports; and at least one first roller mounted on the transport assembly so as to rotate about a pivot point which is spaced from a rotational axis of the at least one first roller.

The present invention further provides for a printing apparatus that comprises a rotatable transport assembly provided at least at one of an input side or output side of a printing section. The transport assembly is adapted to twist a web of photosensitive media about a vertical axis as the photosensitive media is conveyed through the printing apparatus.

DETAILED DESCRIPTION OF THE INVENTION

Figure 1:
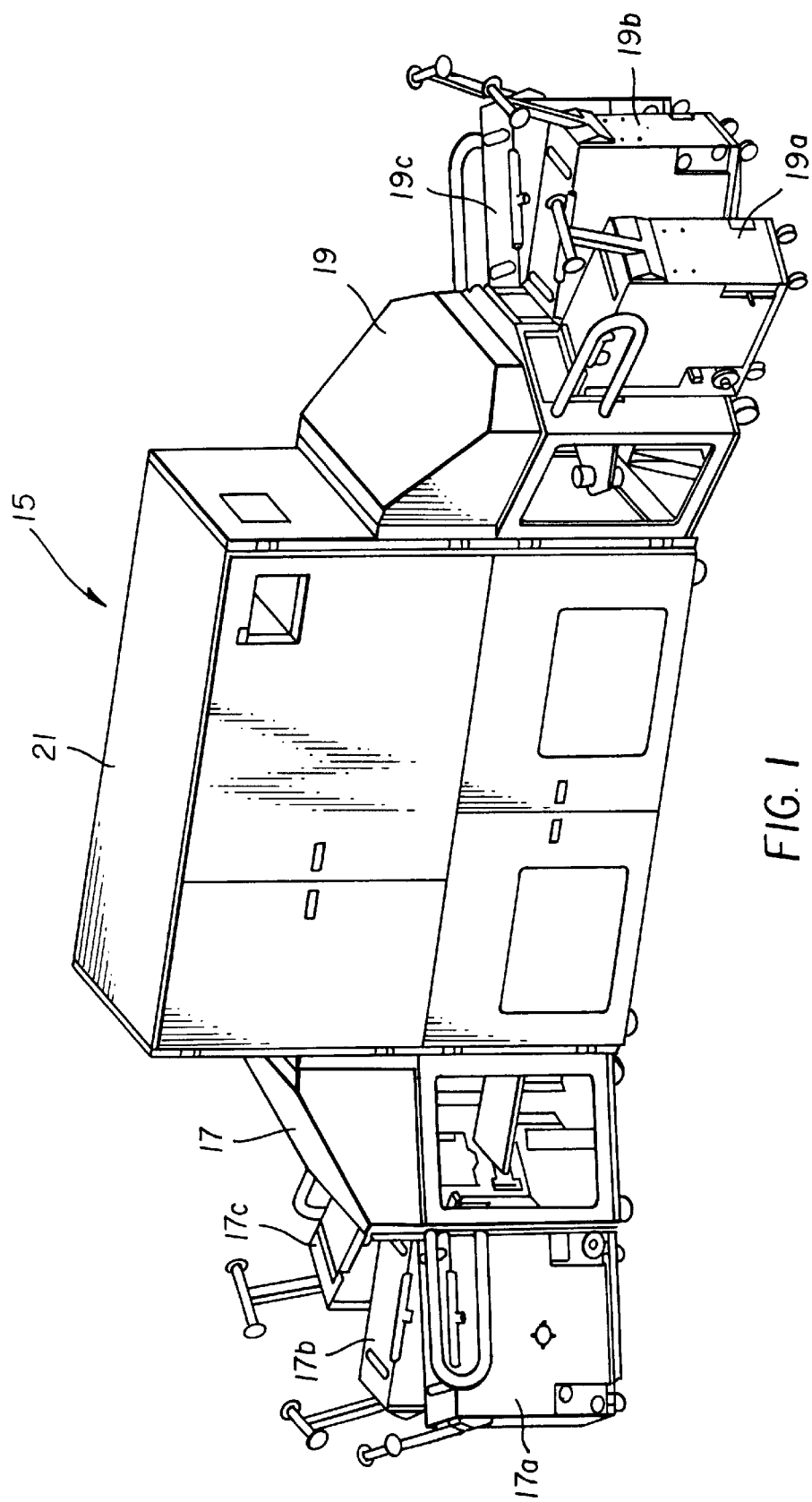
FIG. 1 is a schematic illustration of printing apparatus in accordance with the present invention.
Figure 2:
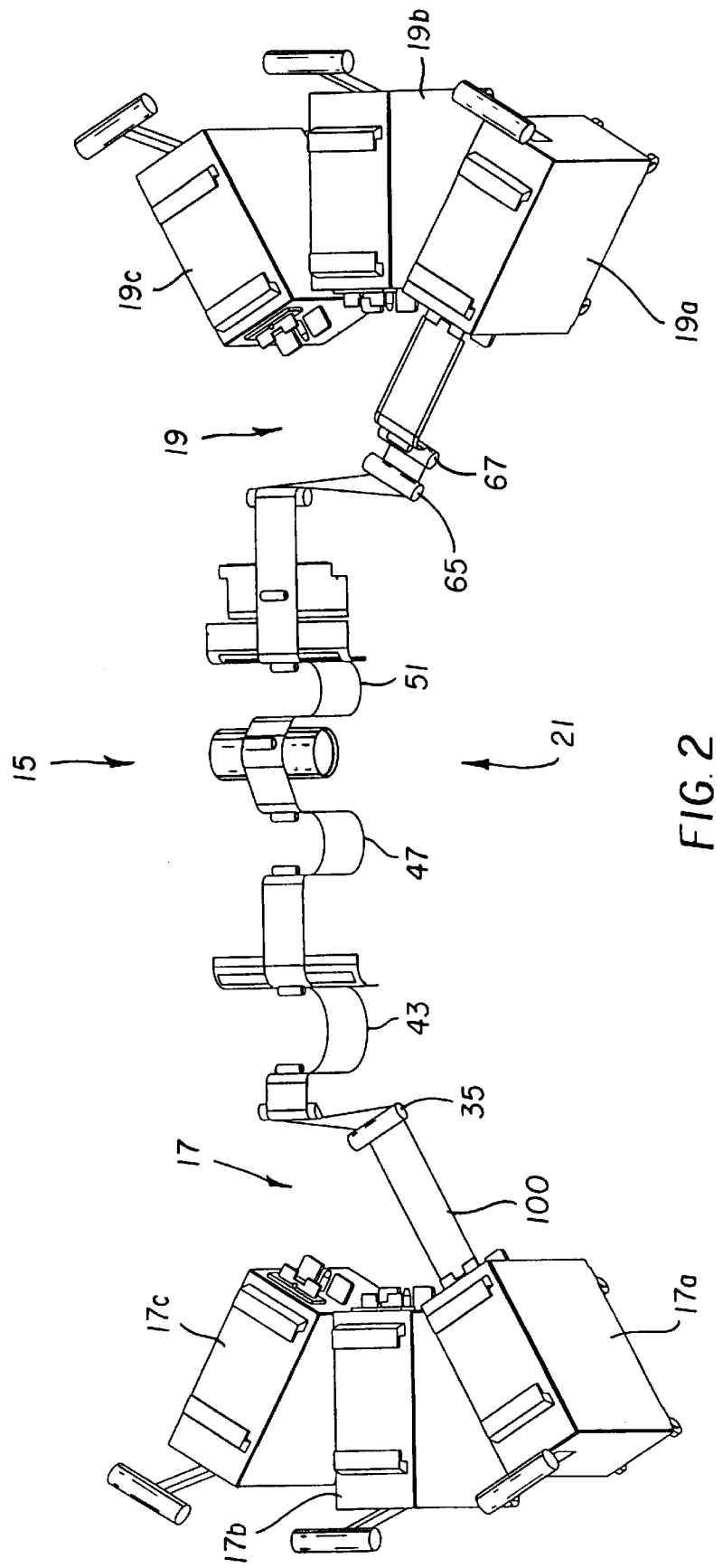
FIG. 2 is a further view of the printing apparatus of the present invention without certain housing sections to better illustrate the twisted web spans.
Figure 3:
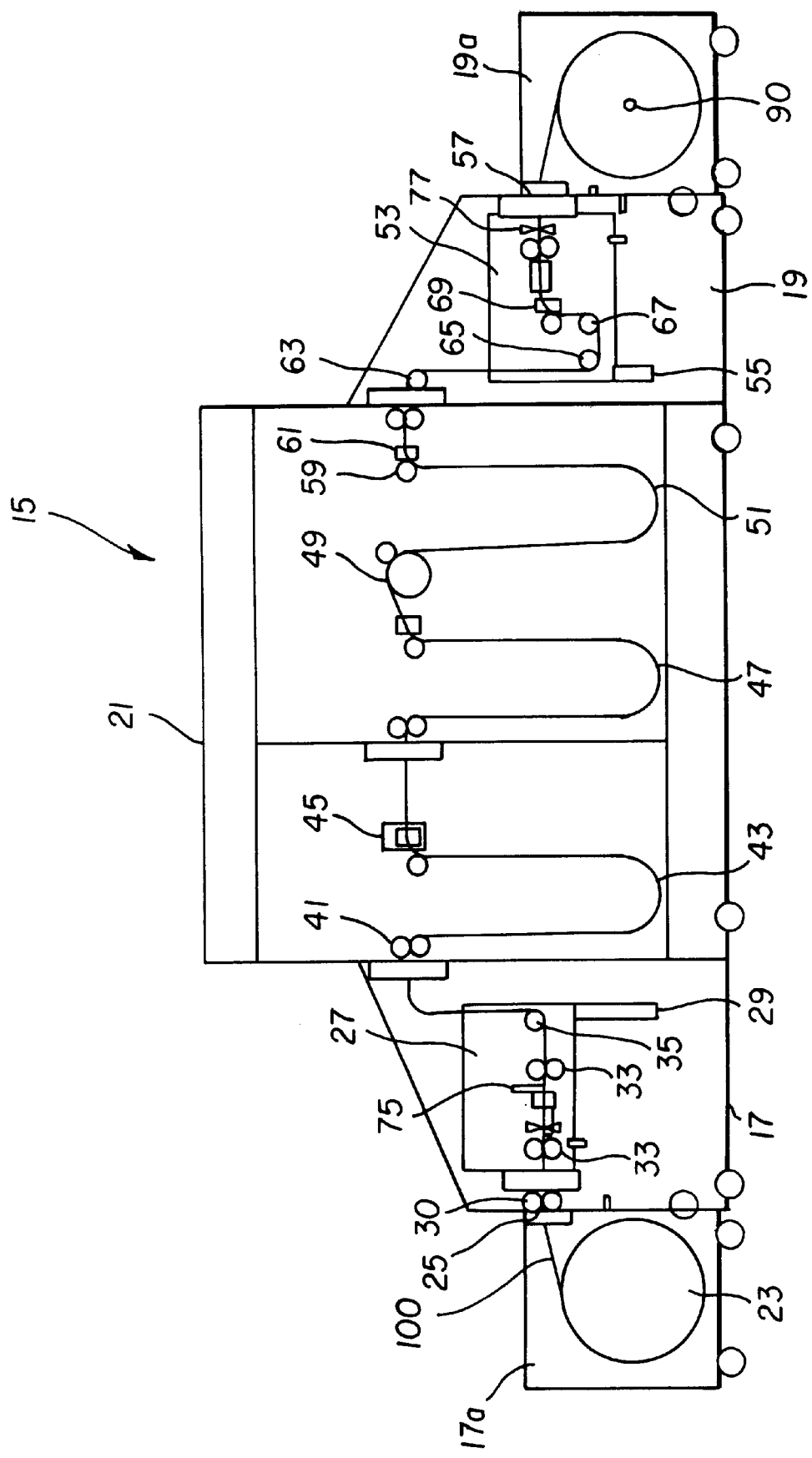
FIG. 3 is a side view of the printing apparatus of the present invention.

Referring now to the drawings, wherein like references numerals designate identical or corresponding parts throughout the several view, FIG. 1 is an overall view of a printing apparatus 15 in accordance with the present invention. As illustrated in FIG. 1, printing apparatus 15 comprises a media supply section 17 and a media take-up section 19. Media supply section 17 is adapted to accommodate a plurality of media supply cassettes 17a–17c, while media take-up section 19 is adapted to accommodate a plurality of media take-up cassettes 19a–19c. As illustrated in FIGS. 1–3, supply cassettes 17a–17c and take-up cassettes 19a–19c are wheel cassettes, which facilitate the interaction between the cassettes and the corresponding supply section and take-out sections (17, 19), however, the invention is not limited thereto, and the cassettes do not have to be wheeled cassettes.

On the supply side, supply cassettes 17a–17c can each contain a roll 23 of, for example, photosensitive media that is to be processed through a printing section 21. Take-up cassettes 19a–19c on the take-up side are initially empty and each include a shaft 90 adapted to receive a roll of photosensitive media after the web has past through printing section 21.

As illustrated in the view of FIGS. 1 and 2, supply cassettes 17a–17c and take-up cassettes 19a–19c are provided at three locations and are angularly positioned with respect to each other. However, the invention is not limited thereto, and the cassettes can be located at various angles, while the printing apparatus can include more than three or less than three cassettes at each of the supply and take-up sides.

Referring to FIG. 3 which illustrates a side view of printing apparatus 15, it noted that supply cassette 17a which is seen in the view of FIG. 3 includes supply roll 23 of media such as, for example, photosensitive media. Supply section 17 includes a plurality of entry openings or ports 25 which mate with a corresponding port or opening in supply cassettes 17a–17c to permit a web 100 of photosensitive material to enter into supply section 17. Only one entry port 25 is illustrated in FIG. 3. It is recognized that supply section 17 includes entry ports 25 corresponding in number and location with a respective supply cassette 17a–17c.

Provided within supply section 17 is a transport assembly 27 which is rotatable to a plurality of positions to mate with each of the media entry ports 25 which correspond to each of the supply cassettes 17a, 17b and 17c. A pair of drive rollers 30 convey the web of photosensitive material into transport assembly 27, where a further arrangement of drive rollers 33 transport the web of photosensitive material through transport assembly 27. As indicated above, transport assembly 27 is rotatable between each of the entry ports 25 so as to selectively accept media from each of the supply cassettes 17a, 17b, 17c. Therefore, during use, after photosensitive material has been emptied from a particular cassette (17a, 17b, 17c), transport mechanism 27 is simply pivoted or rotated about point 29 to the next appropriate position having a cassette (17a, 17b, 17c) with a supply of photosensitive material.

Figure 4:
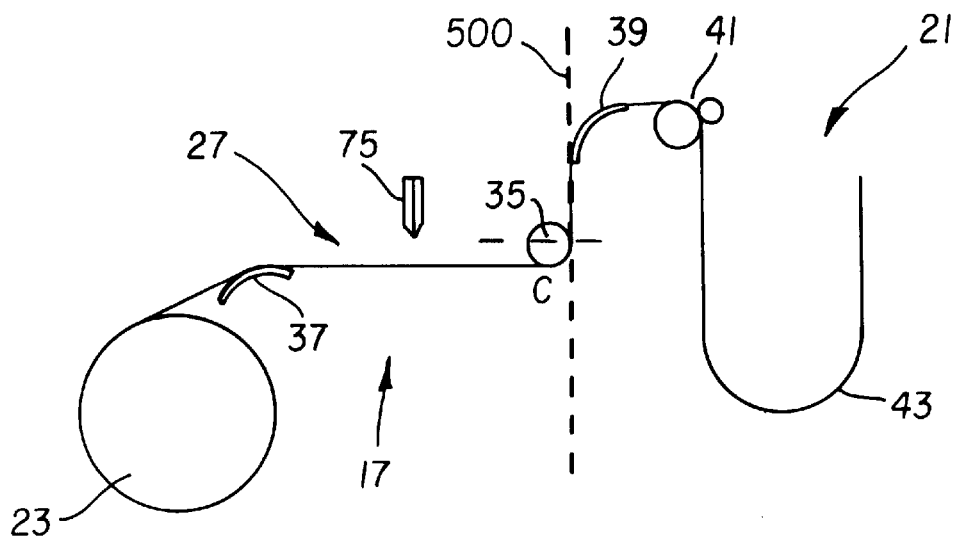
FIG. 4 is a schematic view detailing features of the supply web section of the present invention.
Figure 5:
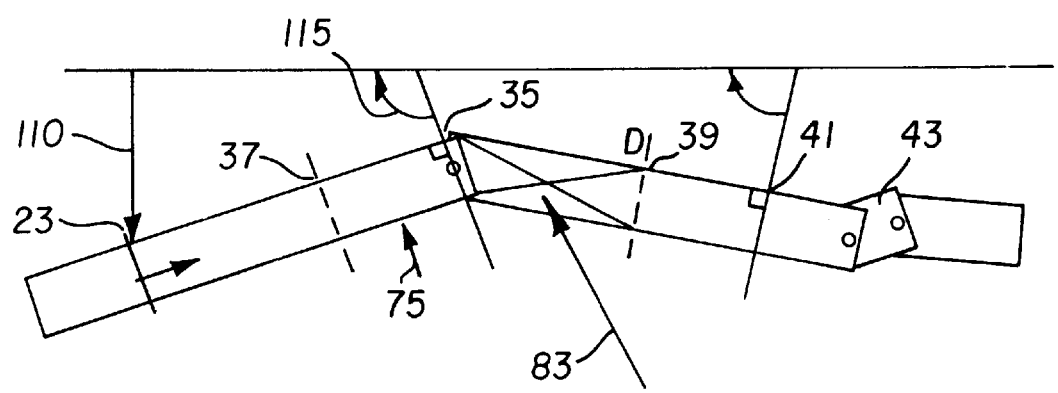
FIG. 5 is a schematic top view of features of the supply web illustrated in FIG. 4.
Figure 6:
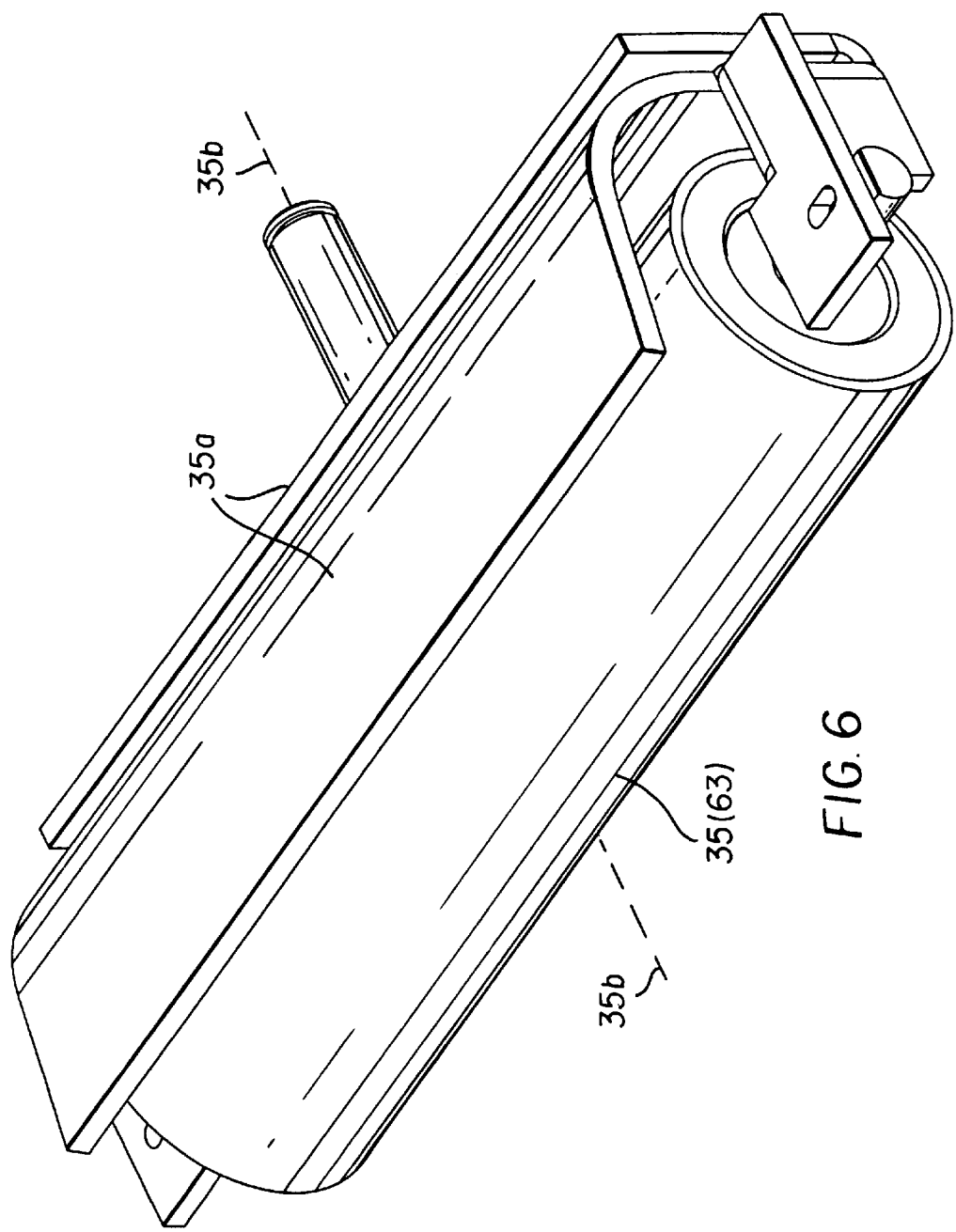
FIG. 6 is an isolated view of a gimballed roller in accordance with the present invention.

A feature of the present invention with respect to the rotatable transport assembly 27 is the creation of a vertical twist at an angle of between 0–90 degrees and preferably approximately ±30 degrees about a vertical axis in the photosensitive web. More specifically, as illustrated in FIGS. 2–6, transport assembly 27 includes a roller 35 which is gimballed. Referring to FIG. 6 which illustrates one mounting example for gimballed roller 35, it is seen that roller 35 can be mounted on a roller support 35a so as to be rotatable with respect to transport assembly 27 about a longitudinal axis 35b of a media span approaching roller 35. This is one example of mounting a roller in a gimballed manner and it is recognized that other methods of mounting a roller in a gimballed manner are possible within the context of the present invention. This arrangement creates a first web span of media which extends from supply roll 23 to gimballed roller 35. With the arrangement of the present invention, as shown in FIG. 5, a lateral position 110 of the span of media from supply roll 23 to gimballed roller 35 is derived by supply roll 23, while an angular position 115 of the media from supply roll 23 to the gimballed roller 35 is derived by gimballed roller 35. As further illustrated in FIGS. 4 and 5, supply section 17 includes a guiding shoe or plate 37, which helps guide the photosensitive material toward gimballed roller 35.

With the arrangement of the present invention, and as illustrated in, for example, FIG. 2, when the media is being first supplied from cassette 17a, gimballed roller 35 will pivot to accommodate the twisting of the web. Gimballed roller 35 guides the web or material through an approximately 90 degree bend and then in an upward vertical direction into printing section 21 as illustrated in FIGS. 2–4. Printing section 21 can include a guiding plate or shoe 39 (FIG. 4) which changes the conveying direction of the web, and a drive and pressure roller arrangement 41. Therefore, the span of the photosensitive material between roller 35 and drive and pressure roller arrangement 41 defines a second span of the photosensitive material passing through printing apparatus 15. With the arrangement of the present invention, gimballed roller 35 essentially acts as a hinge between the span of photosensitive material between supply roll 23 and gimballed roller 35, and the span of photosensitive material between gimballed roller 35 and drive and pressure roller arrangement 41. This is conceptually illustrated in FIG. 5 of the application. Gimballed roller 35 which rotates as a unit with transport assembly 27 will pivot with respect to transport assembly 27 in accordance with the twist of the web between roller 35 and plate 39 as transport assembly 27 is rotated between supply cassettes 17a–17c.

Printing section 21 can be part of a known laser printer. However, the present invention is not limited thereto and other types of printing systems are possible within the context of the present invention. After the photosensitive web enters printing section 21, as illustrated more particularly in FIG. 3, the material can sequentially pass through a first slack loop 43, through a paper punching/marking section 45, through a second slack loop 47, over a print drum 49 where the material can be laser scanned in accordance with image information (obtained separately by scanning a processed film strip), through a third slack loop 51 and into take-up section 19.

Like supply section 17, take-up section 19 includes a pivotable or rotatable transport or take-up assembly 53 which is rotatable about point 55, so as to be in mating engagement with a corresponding media exit opening or ports 57 provided on the take-up section 19. As described with reference to supply section 17, take-up section 19 includes the plurality of exit openings 57 which correspond in number and location with take-up cassettes 19a, 19b, 19c. Take-up cassettes 19a, 19b, 19c are provided at openings 57, so that the web of photosensitive material is supplied directly to the take-up cassettes. When a take-up cassette (19a, 19b, 19c) is full of exposed material, transport assembly 53 is rotated about point 55 to the next take-up cassette (19a, 19b, 19c).

Figure 7:
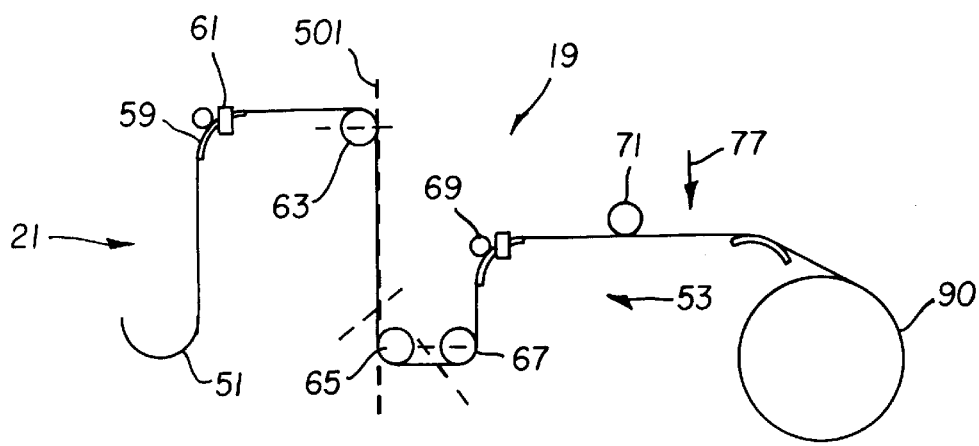
FIG. 7 is a schematic view of the take-up section of the present invention.
Figure 9:
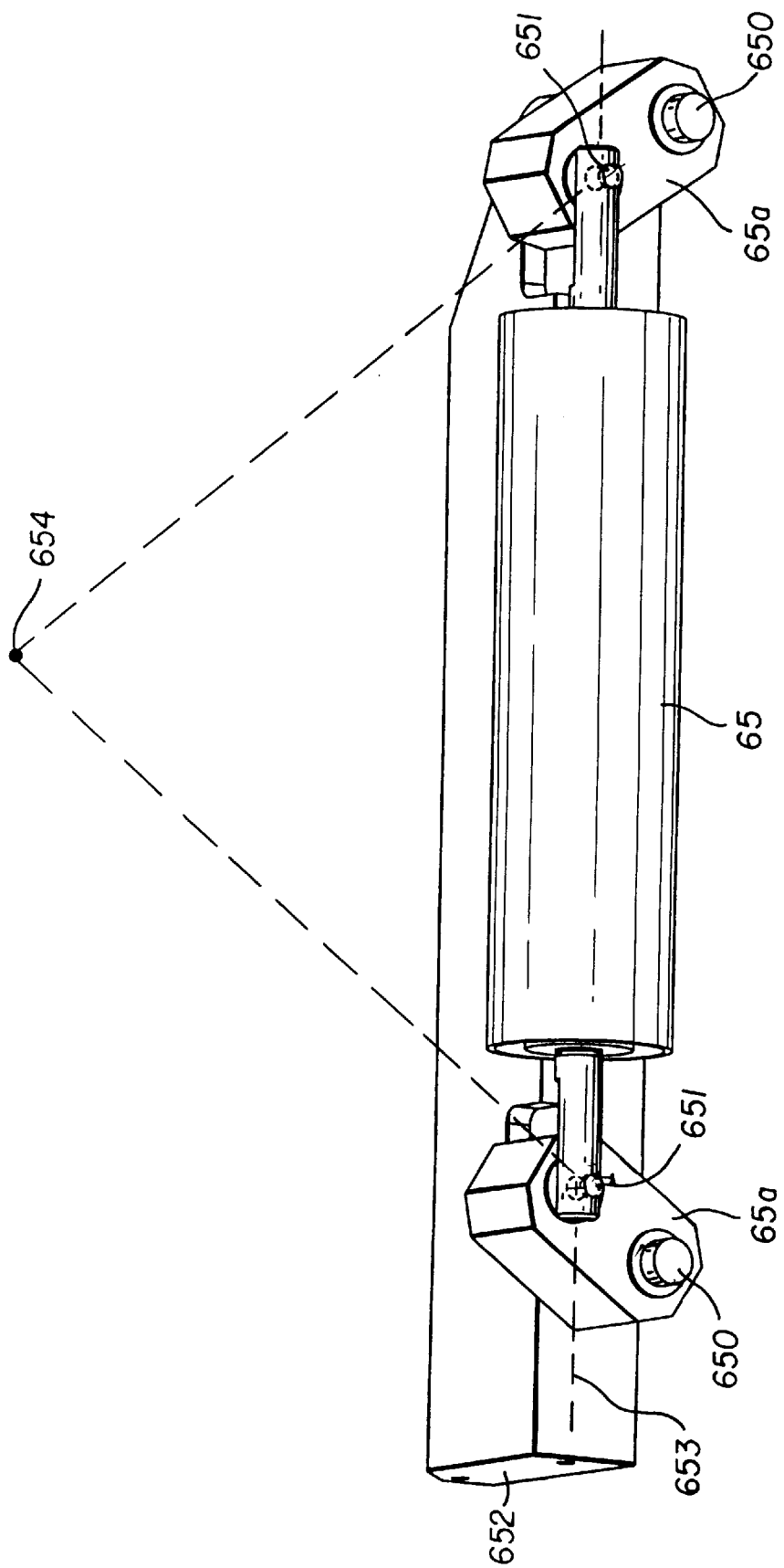
FIG. 9 is an isolated view of a castered roller in accordance with the present invention.

Referring particularly to FIG. 7, at the exit area of printing section 21, a combination of a shoe or plate 59 and a lateral guide 61 is provided to guide the web towards the exit of printing section 21. At the exit of printing section 21, a gimballed roller 63 is provided. Roller 63 guides the web through an approximately 90 degree bend and is mounted as previously described with respect to gimballed roller 35 and illustrated in FIG. 6. After the media passes over gimballed roller 63, it is conveyed in a substantially vertical direction within take-out section 19, and to rotatable transport or take-up assembly 53. Rotatable transport assembly 53 includes a castered roller 65 and a castered and gimballed roller 67. The specifics of castered roller 65 are illustrated in FIG. 9. As shown in FIG. 9, castered roller 65 is pivotally mounted on links 65a which pivot about points 650, 651 and are mounted on support 652. The axes of links 65a intersect at a point 654 which defines an upstream pivot or caster axis for roller 65. Thus, roller 65 rotates about rotational axis 653 and due to the interaction of links 65a rotates about an axis through point 654 which is spaced from and perpendicular to rotational axis 653. This enables roller 65 to self-align to the web.

Figure 10:
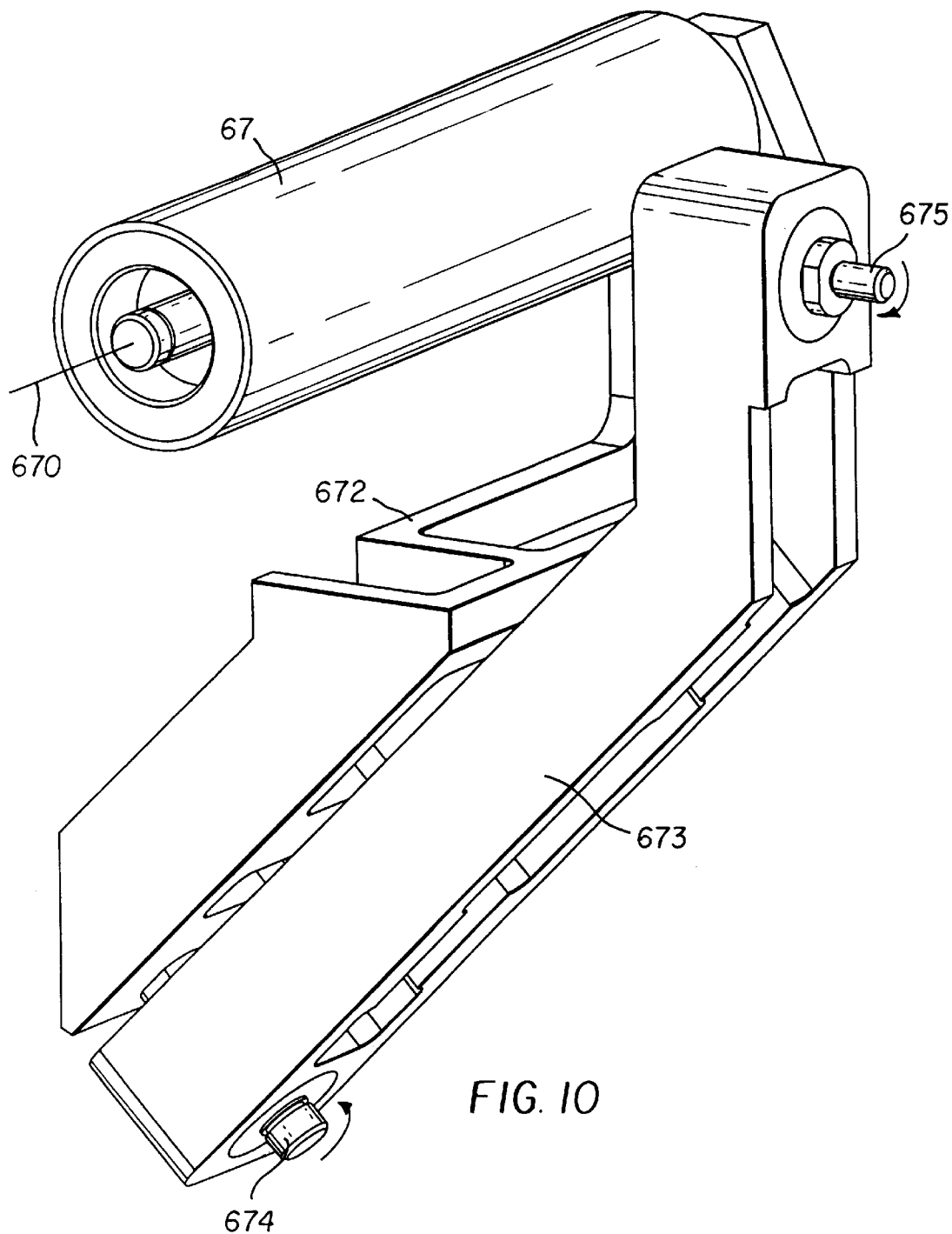
FIG. 10 is a isolated view of a castered and gimballed roller in accordance with the present invention.

Castered and gimballed roller 67 is illustrated in detail in FIG. 10. As shown in FIG. 10, roller 67 is mounted on a support 672 so as to be rotatable about rotational axis 670. Roller 67 and support 672 are mounted as a unit on a further support 673 such that roller 67 and support 672 pivot as a unit about pivot point or caster axis 674 relative to further support 673. Pivot point 674 is spaced from and perpendicular to rotational axis 670. Roller 67 is further rotatable as a unit relative to transport assembly 53 about pivot point or gimbal axis 675 which extends along a longitudinal axis of a media span at roller 67. FIGS. 9 and 10 respectively illustrate examples of mounting rollers in a castered and castered and gimballed manner. It is recognized that the present invention is not limited thereto and that other methods of mounting the rollers in a castered and castered and gimballed manner are possible within the context of the present invention.

With the arrangement as illustrated in FIG. 7, as the web is vertically led in a downward direction from roller 63 to roller 65, based on the position of transport assembly 53, for example, when feeding photosensitive material to either cassettes 19c or 19a, the web is twisted at a specific angle.

After being conveyed by castered and gimballed roller 67, which self-align to the web, the web can be upwardly conveyed to a shoe and lateral guide arrangement 69, and thereafter fed by feeding roller 71 to an appropriate take-up cassette 19a–19c.

Figure 8:
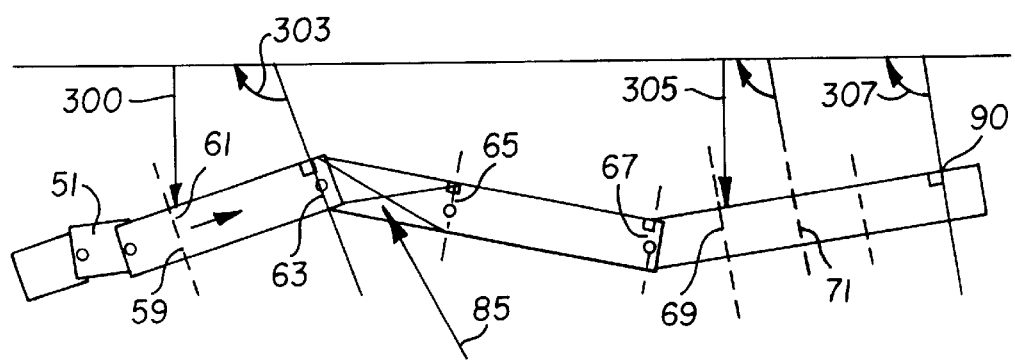
FIG. 8 is a schematic top view of the take-up section of FIG. 7.

In a feature of the present invention, a third span of the photosensitive material is defined between lateral guide 61 and gimballed roller 63 In this span, as illustrated in FIG. 8, a lateral position 300 is derived by lateral guide 61, while an angular position 303 is derived from gimballed roller 63. A further span is defined between guide arrangement 69 and take-up roll 90. In this further span, a lateral position 305 is derived from guide arrangement 69, while an angular position 307 is derived from take-up roll 90 in take-up cassette (19a–19c). Therefore, as conceptually illustrated in FIG. 8, the span of the web from roller 63 to guide arrangement 69 essentially acts as a hinge as transport assembly 53 rotates, which permits the feeding of photosensitive material without appreciable lateral tracking of the photosensitive material. Essentially, roller 67 is castered and gimballed so as to act as a hinge and provide zero constraint, while roller 67 is castered so as to provide zero constraint.

Thus, as transport assembly 53 rotates between take-up cassettes 19a–19c, the web will be twisted about a vertical axis at an angle of between 0 and 90 degrees, for example, at an angle of ±30 degrees between roller 63 and roller 65, which pivot relative to transport assembly 53 to accommodate the twisting while minimizing web tracking variation. In a further feature of the present invention, and referring specifically to the supply side and more specifically to transport assembly 27 at supply section 17, as illustrated in FIGS. 3 and 4, a splicer 75 is provided on rotatable transport assembly 27. Thus, splicer 75 and gimballed roller 35 are rotatable as a unit together with transport assembly 27. The arrangement of the present invention permits splicer 75 to be pivotable from one cassette 17a to another cassette 17b to a further cassette 17c. This provides for a straight thrust of the web from each cassette (17a–17c) such that the span from the supply cassette (17a–17c) is always straight.

Further, the web can be twisted about vertical axis 500 (FIG. 4) between gimballed roller 35 and plate or shoe 39 without appreciable tracking error because the web is two dimensionally stiff at twist angles of less than 90 degrees. Splicer 75 serves to splice the end of the material from an empty cassette to begin the paper of a next full cassette. With reference to the diagrams of FIGS. 5 and 8, reference numeral 83 schematically illustrates the twisted web span entering the printing section 21, while reference numeral 85 schematically illustrates the twisted web span exiting the printing section 21. Each of the web spans are respectively twisted about vertical axis 500 (FIG. 4) and vertical axis 501 (FIG. 7).

In a further feature of the present invention, and specifically relating to take-up section 19 and more specifically to transport assembly 53, a known cutter 77 is provided on transport assembly 53. Cutter 77 along with castered roller 65 and castered and gimballed roller 67 are rotatable as a unit with transport assembly 53. The cutter is utilized on the take-up side to cut the paper an appropriate length, at the termination of the roll. Thereafter, transport assembly 53 can be rotated to the next empty take-up cassette (19a–19c).

Control of rotatable transport assemblies 27 and 53 can be by way of a computer and/or microprocessor provided in printing apparatus 15, which control a moving mechanism such as a motor and are responsive to signals with respect to, for example, the amount of paper in the cassettes, the position of the web, etc. For example, a supply cassette can include sensors which communicate with sensors within the printing section, to indicate when a supply cassette is empty or full, and similarly, a take-up cassette can include sensors to indicate the amount of paper in the take-up cassette. As a further feature, a sensor such as a counter can be provided along the web path, to count the amount of paper, and utilize this as a reference with respect to the amount of paper within a specific cassette.

Accordingly, the present invention provides for a printing apparatus that permits a connection of a plurality of supply and take-up cassettes through a controlled path geometry and controlled constraints. The web path through the printing apparatus undergoes two approximately 90° bends at each end. At each pair of bends the web is pivoted and undergoes a twist about a vertical line or a line which is colinear to the pivot axis. This pivot motion permits the web to be routed to and from a plurality of supply and take-up cassettes so as to merge multiple paper paths into one central path. The pivot motion also creates straight feed paths to a splicer and from a cutter and eliminates the need for a complex shuttle mechanism or complicated paper handling.

The invention has been described in detail with particular reference to certain preferred embodiments thereof, but it will be understood that variations and modifications can be effected within the spirit and scope of the invention.

What is claimed is:

1. A printing apparatus comprising:
   a media supply section having a transport assembly and a plurality of media entry openings, said transport assembly being rotatable to each of said media entry openings so as to accept media from a selected one of said media entry openings;
   a printing section adapted to accept media from the media supply section; and
   a take-up section which is adapted to receive media from the printing section, said take-up section comprising a take-up assembly and a plurality of media exit openings, said take-up assembly being rotatable to each of said media exit openings so as to discharge media through a selected one of said media exit openings.

2. A printing apparatus according to claim 1, wherein said transport assembly comprises a splicing assembly and a first roller which is rotatable, with respect to said transport assembly, about a longitudinal axis of media approaching said first roller, said splicing assembly and said roller being further rotatable as a unit together with said transport assembly.

3. A printing apparatus according to claim 1, further comprising at least one media supply cassette having a media supply roll therein and positioned at one of said media entry openings to supply media to said supply section.

4. A printing apparatus according to claim 2, further comprising at least one media supply cassette having a media supply roll therein and positioned at one of said media entry points to supply media to said supply section, such that a first media span for a media path through said printing apparatus is defined between said media supply roll and said first roller.

5. A printing apparatus according to claim 4, wherein said printing section comprises a first guide plate which guides media into said printing section.

6. A printing apparatus according to claim 5, wherein said rotatable transport assembly is rotatable to least one position which causes a twisting about a substantially vertical axis of said media along a second media span between said first roller and said first guide plate.

7. A printing apparatus according to claim 4, wherein a lateral position of said first media span is derived by said media supply roll and an angular position of said first media span is derived by said first roller.

8. A printing apparatus according to claim 5, wherein said printing section comprises a printing section drive roller downstream of said first guide plate which drives said media to at least one slack loop in said printing section.

9. A printing apparatus according to claim 8, wherein said printing section comprises a second guide plate which leads media to a printing section exit roller, said printing section exit roller being rotatable about a longitudinal axis of media approaching said printing section exit roller.

10. A printer according to claim 9, wherein said take-up assembly comprises a castered roller and a castered and gimballed roller.

11. A printing apparatus according to claim 10, wherein the take-up assembly is rotatable to at least one position in which a third media span between the printing section exit roller and the castered roller is twisted about a substantially vertical axis.

12. A printing apparatus to claim 1, further comprising at least one take-out cassette located at one of said media exit openings.

13. A printing apparatus according to claim 1, wherein a cutting assembly is positioned on said take-up assembly.

14. A printing apparatus according to claim 6, where said media is twisted at an angle of between 0 and 90 degrees with respect to said vertical axis.

15. A printing apparatus according to claim 11, where said media is twisted at an angle of between 0 and 90 degrees with respect to said vertical axis.

16. A printing apparatus comprising:
    a media supply section comprising a first transport assembly which conveys media along a first transport assembly longitudinal axis, said first transport assembly being rotatable between a plurality of supply entry ports on said media supply section to selectively accept media from each of said supply entry ports, said first transport assembly further comprising at least one first roller which is rotatable with respect to said first transport assembly about said first transport assembly longitudinal axis; and
    a printing section which receives media from said media supply section, said printing section comprising a first guide plate which guides media from said at least one first roller into said printing section, said first transport assembly being rotatable to least one position which creates a twist in a media span of said media between said at least one first roller and said first guide plate.

17. A printing apparatus according to claim 16, wherein said printing section comprises at least one second roller which is rotatable about a longitudinal axis of a media span approaching the at least one second roller.

18. A printing apparatus according to claim 17, further comprising:
    a take-up assembly having a second transport assembly which conveys media along a second transport assembly longitudinal axis, said second transport assembly being rotatable between a plurality of media exit ports on said take-up assembly, said second transport assembly comprising at least one third roller which receives the media from said at least one second roller of said printing section, said at least one third roller being adapted to rotate about a pivot point which is spaced from a rotational axis of said at least one third roller, said second transport assembly being rotatable to at least one position which creates a twist in a media span of the media between the at least one second roller of the printing section and the at least one third roller of said second transport assembly.

19. A printing apparatus according to claim 18, wherein said second transport assembly comprises at least one fourth roller which is adapted to rotate about a pivot point spaced from a rotational axis of said at least one fourth roller and rotate about the second transport assembly longitudinal axis.

20. A printing apparatus according to claim 19, further comprising at least one media supply cassette positioned at one of said supply entry ports and at least one media take-up cassette positioned at one of said media exit ports.

21. A media supply assembly comprising:
    a plurality of media entry ports;
    a transport assembly which is rotatable to each of said media entry ports to receive and convey media entering through said media entry ports along a longitudinal axis; and
    at least one roller mounted on said transport assembly so as to be rotatable about said longitudinal axis, said at least one roller conveying media along said transport assembly toward an exit port of said media supply assembly.

22. A media supply assembly according to claim 21, further comprising a splicer provided on said transport assembly so as to be rotatable as a unit with said transport assembly.

23. A media take-up assembly comprising a media entry port for receiving media therein;

a plurality of media exit ports;

a transport assembly which conveys media from said media entry port to one of said media exit ports, said transport assembly being rotatable to each of said media exit ports; and at least one first roller mounted on said transport assembly so as to rotate about a pivot point which is spaced from a rotational axis of said at least one first roller.

24. A media take-up assembly according to claim 23, further comprising at least one second roller mounted downstream of said at least one first roller, said at least one second roller being adapted to rotate about a pivot point spaced from a rotational axis of said at least one second roller and rotate with respect to said transport assembly about a longitudinal axis of a media span between said at least one first roller and said at least one second roller.

25. A media-take-up assembly according to claim 23, further comprising a cutter provided on said transport assembly so as to be rotatable as a unit with said transport assembly.

26. A printing apparatus comprising:

a rotatable transport assembly provided at least at one of an input side or output side of a printing section, said transport assembly being adapted to twist a web of photosensitive media about a vertical axis as said photosensitive media is conveyed through said printing apparatus.

27. A printing apparatus according to claim 26, where said media is twisted at an angle of between 0 and 90 degrees with respect to said vertical axis.

* * * * *